US006842109B2

(12) United States Patent
Lin

(10) Patent No.: US 6,842,109 B2
(45) Date of Patent: Jan. 11, 2005

(54) METHOD FOR SETTING UP AN ALARM FOR MONITORING PRESSURE IN TIRES OF A VEHICLE AND DEVICE FOR THE SAME

(75) Inventor: Sheng-Hsiung Lin, Kaohsiung (TW)

(73) Assignee: Lite-On Automotive Corp., Kaohsiung (TW)

( * ) Notice: Subject to any disclaimer, the term of this patent is extended or adjusted under 35 U.S.C. 154(b) by 38 days.

(21) Appl. No.: 10/341,034

(22) Filed: Jan. 13, 2003

(65) Prior Publication Data

US 2004/0051633 A1 Mar. 18, 2004

(51) Int. Cl.[7] .................................................. B60C 23/00

(52) U.S. Cl. ........................ 340/442; 340/438; 340/444; 340/445; 340/447; 73/146.5; 73/146.8; 116/34 R

(58) Field of Search ................................. 340/438, 442, 340/444, 445, 447; 73/146.5, 146.8; 116/34 R

(56) References Cited

U.S. PATENT DOCUMENTS 5,553,491 A * 9/1996 Naito et al. ................ 73/146.5
5,900,809 A * 5/1999 Hebert ........................ 340/442
5,929,756 A * 7/1999 Randazzo et al. .......... 340/444
5,982,279 A * 11/1999 Tominaga et al. .......... 340/444
6,278,363 B1 * 8/2001 Bezek et al. ................ 340/442
6,362,731 B1 * 3/2002 Lill ............................ 340/445
6,448,891 B2 * 9/2002 Barnett ........................ 340/438
6,518,875 B2 * 2/2003 DeZorzi ..................... 340/442
6,612,165 B2 * 9/2003 Juzswik et al. ............ 73/146.5

* cited by examiner

*Primary Examiner*—Daniel Wu
*Assistant Examiner*—Son Tang
(74) *Attorney, Agent, or Firm*—Alan Kamrath; Nikolai & Mersereau P.A.

(57) ABSTRACT

A method has acts of detecting pressure value in each tire of the vehicle, calculating a base point of pressure according to the detected pressure values and calculating a safety scope in pressure reference to the base point of pressure. An alarm will be generated when the pressure value in tires has a difference relative to the base point. With the method, a pressure detecting device can fit with different types or models of vehicles, and the use of the pressure detecting device is versatile.

8 Claims, 3 Drawing Sheets

METHOD FOR SETTING UP AN ALARM FOR MONITORING PRESSURE IN TIRES OF A VEHICLE AND DEVICE FOR THE SAME

BACKGROUND OF THE INVENTION

1. Field of the Invention

The present invention relates to a method and a device, and more particularly to a method for setting up an alarm for monitoring pressure in tires of a vehicle and a device for the same.

2. Description of Related Art

When the pressure in the tire of the vehicle is lowered because the tire is punctured, etc., the driver cannot steer the vehicle in a stable way and the tire easily explodes so as to cause danger. Therefore, a pressure detecting device is mounted in the tire of the vehicle to detect the pressure in the tire. With the detecting device, an alarm will generate to alert the driver when the pressure in the tire is over or lower than a desired level.

In addition, the desired pressure level of the tire is determined according to the type or the model of the vehicle. Therefore, for different types or models of vehicles, the conventional pressure detecting device must be set with a special standard to fit with a specific vehicle and cannot fit with another type or model of vehicle. Thus, the use of the conventional pressure detecting device is not versatile. The provider of the conventional pressure detecting device must prepare different devices for different vehicles, such that the cost for the conventional pressure detecting device is high.

To overcome the shortcomings, the present invention tends to provide a method for setting up an alarm for pressure in tires of a vehicle to mitigate or obviate the aforementioned problems.

SUMMARY OF THE INVENTION

The main objective of the invention is to provide a method of setting up an alarm for the pressure in the tires of a vehicle and the pressure detecting device being able to fit with different types or models of vehicles. The method has acts of detecting pressure value in each tire of the vehicle, calculating a base point of pressure according to the detected pressure values and calculating a safety scope in pressure reference to the base point of pressure. Accordingly, an alarm will be generated when the pressure value in the tires has a difference relative to the base point. This can make a pressure detecting device fit with different types or models of vehicle, and the use of the pressure detecting device is versatile.

Other objectives, advantages and novel features of the invention will become more apparent from the following detailed description when taken in conjunction with the accompanying drawings.

DETAILED DESCRIPTION OF PREFERRED EMBODIMENT

Figure 1:
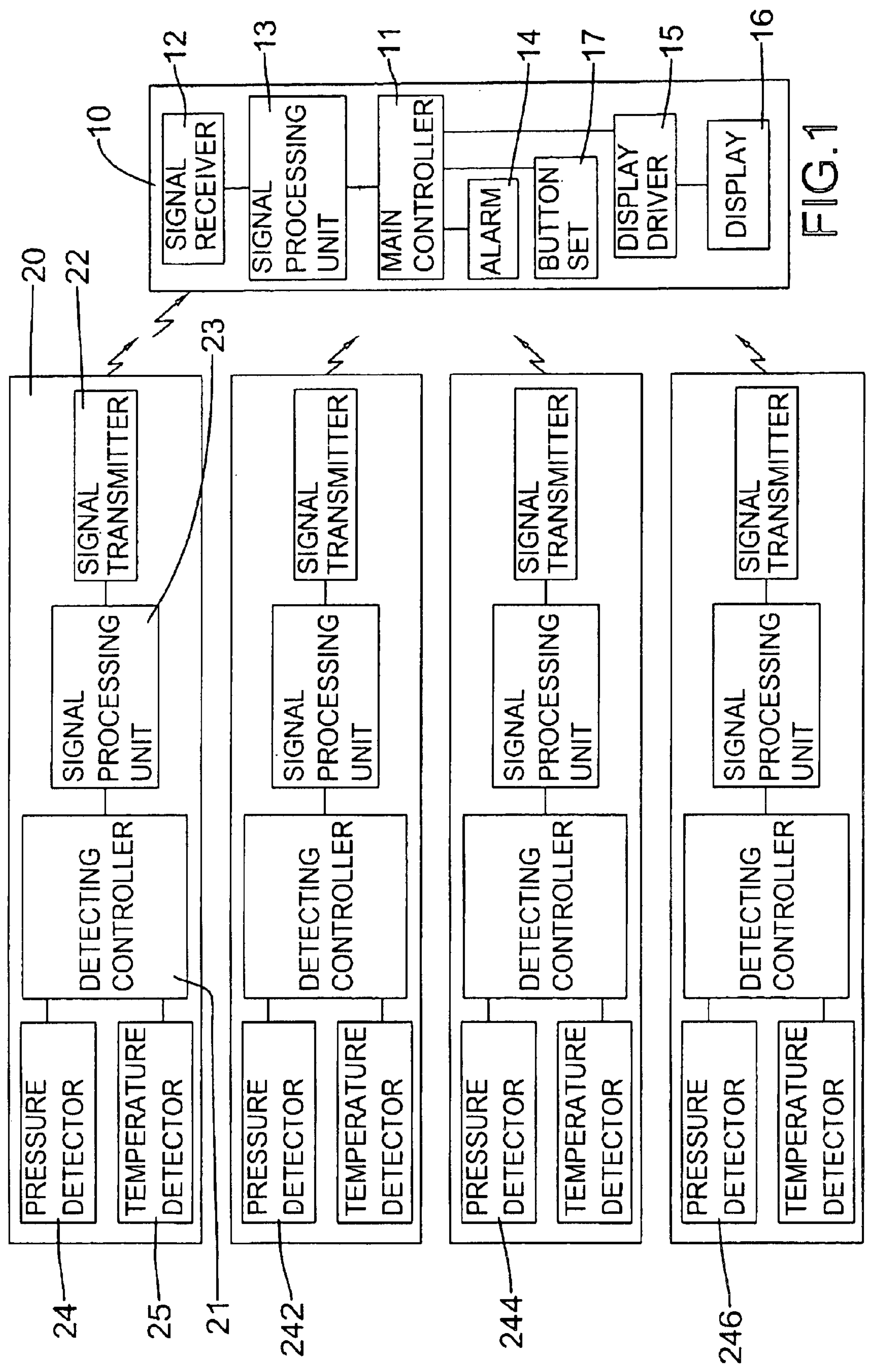
FIG. 1 is a block diagram of a detecting device in accordance with the present invention.

With reference to FIG. 1, a detecting device in accordance with the present invention comprises a main control unit (10) and multiple detecting units (20). The main control unit (10) comprises a main controller (11), a signal processing unit (13), a signal receiver (12), an alarm (14) and a display set. The main controller (11) has a calculation program for calculating a base point and a safety scope according to pressure values detected by the detecting units (20). The signal processing unit (13) is electrically connected to the main controller (11), and the signal receiver (12) is electrically connected to the signal processing unit (13). The alarm (14) is electrically connected to the main controller (11). The display set comprises a display driver (15) electrically connected to the main controller (11) and a display (16) electrically connected to the display driver (15). In addition, the main control unit (10) further comprises a button set (17) electrically connected to the main controller (11).

The detecting units (20) are electrically connected to the main control unit (10) with wires or wirelessly. Each detecting unit (20) is mounted in one of the tires of the vehicle to detect the pressure in the corresponding tire. Each detecting unit (20) comprises a detecting controller (21), a pressure detector (24,242,244,246), a signal processing unit (23) and a signal transmitter (22). The pressure detector (24,242,244,246) is electrically connected to the detecting controller (21) to measure the pressure in the corresponding tire and sends the detected pressure value to the detecting controller (21). The signal processing unit (23) is electrically connected to the detecting controller (21), and the signal transmitter (22) is electrically connected to the signal processing unit (23). The pressure value detected by the pressure detector (24,242,244,246) is sent to the signal processing unit (23) from the detecting controller (21) and is sent out from the signal transmitter (22). The signal receiver (12) of the main control unit (10) receives the pressure value signal and sends the signal to the main controller (11) through the signal process unit (13).

Figure 2:
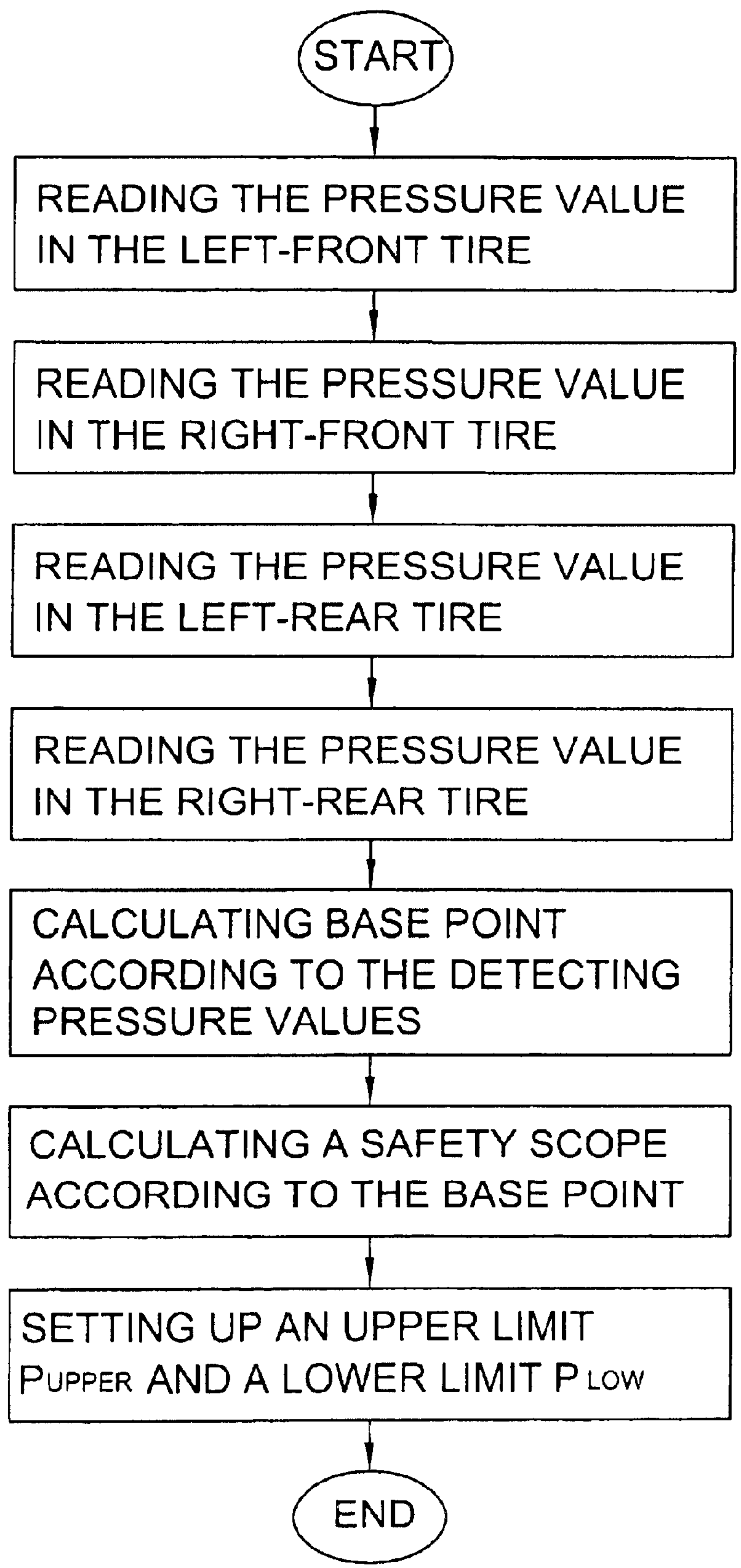
FIG. 2 is a flow chart of a method of setting up an alarm for monitoring pressure in tires of a vehicle in accordance with the present invention.
Figure 3:
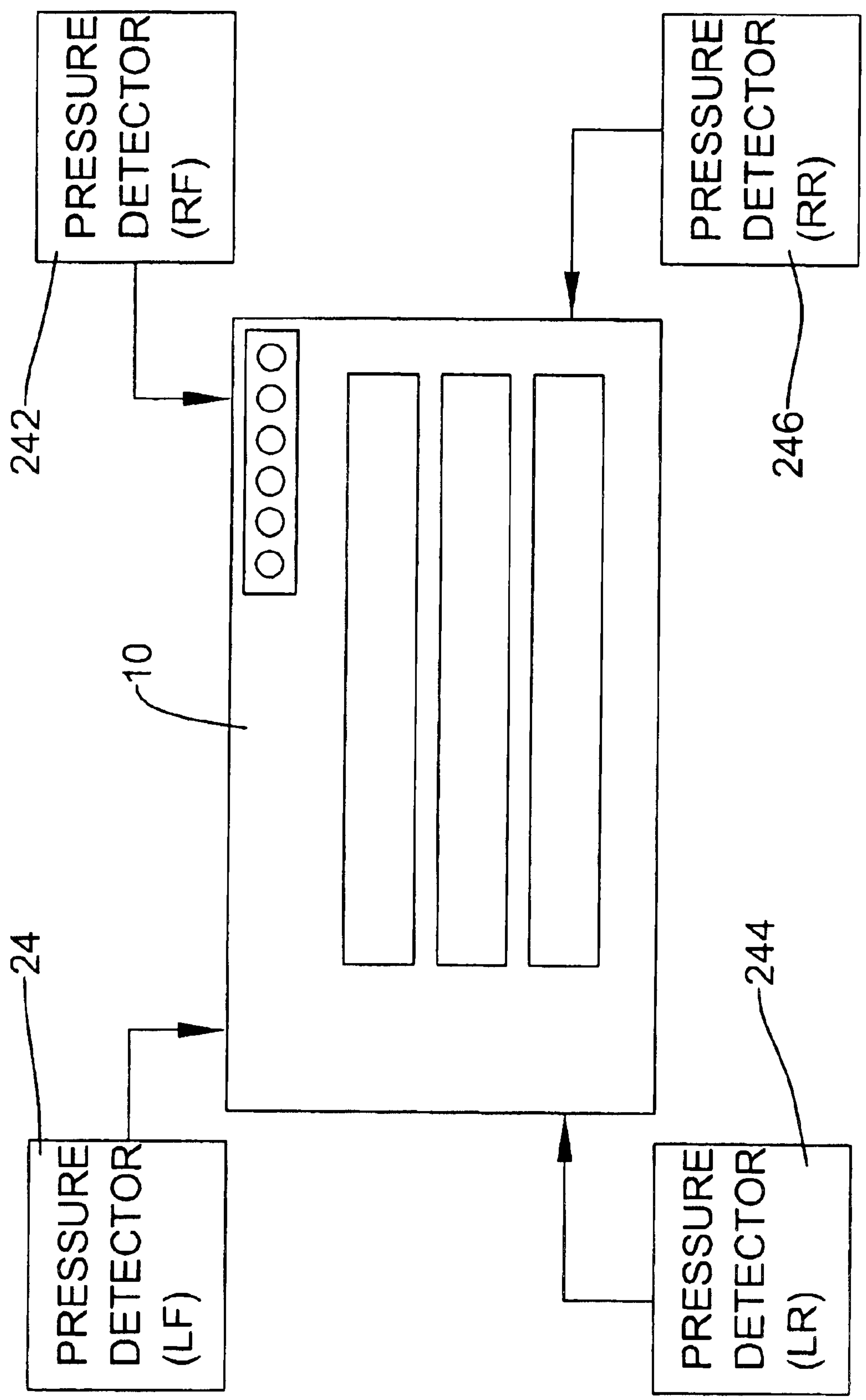
FIG. 3 is an operational schematic diagram of the detecting device in FIG. 1.

With reference to FIGS. 1 to 3, a method of setting up an alarm for monitoring pressure in tires of a vehicle in accordance with the present invention comprises acts as follows:

1. Detecting pressure value in each tire of the vehicle with the detecting units. The pressure values detected by the detecting units (20) are sent to main controller (11).
2. Calculating a base point of pressure according to the detected pressure values with the calculation program in the main controller (11). To calculate the base point is to average the detected pressure values. In practice, the base point has a front-tires base part ($P_f$) corresponding to the pressure values in front tires of the vehicle and a rear-tires base part ($P_r$) corresponding to the pressure values in rear tires of the vehicle. The front-tires base part is an average of the pressure values detected from the front tires of the vehicle, i.e. $P_f=(P_{lf}+P_{rf})/2$. Wherein, $P_{lf}$ is the pressure value from the left-front tire of the vehicle, and $P_{rf}$ is the pressure value from the right-front tire of the vehicle. The rear-tires base part is an average of the pressure values detected from the rear tires of the vehicle, i.e. $P_r=(P_{lr}+P_{rr})/2$. Wherein, $P_{lr}$ is the pressure value from the left-rear tire of the vehicle, and $P_{rr}$ is the pressure value from the right-rear tire of the vehicle.
3. Calculating a safety scope X in pressure reference to the base point of pressure. With the safety scope, an upper limit of pressure is defined as follow:

$$Pupper=P\times(1+X\%)$$

A lower limit of the pressure is defined as fellow:

$$Plow = P \times (j - X\%)$$

Accordingly, when the pressure in any tire is over the $P_{upper}$ or lower than the $P_{low}$, this means the condition of the tire in pressure is unusual. Consequently, an alarm signal will be generated to alert the driver.

In use, the base point and the safety scope is predetermined according to the type or model of vehicle and is set up in the main controller (11). When pressure in any tire is measured to be unusual by the detecting unit (20), the main controller (11) will send a signal to the alarm (14) which in turn alerts the driver. In addition, the main controller (11) also actuates the display (16) through the display driver (15) to show the condition of the tires of the vehicle. The driver can automatically check the tires, and fix them in time, such that the rate of accident is lowered. The user can control the main control (11) to operate or change the show of the display (16) through the button set (17).

With the method of setting up alarm for monitoring pressure in accordance with the present invention, the detecting device can be fitted with a different type or model of vehicle by means of changing the base point and the safety scope. The use of the detecting device is versatile. In addition, each detecting unit (20) further comprises a temperature detector (25) electrically connected to the detecting controller (21) to measure the temperature in the corresponding tire. Accordingly, the temperature in the tire can be monitored with the detecting device and the driver can be aware of danger from an overheating tire.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of setting up an alarm for monitoring pressure in tires of a vehicle comprising:

detecting a pressure value in each tire of the vehicle;

calculating a base point of pressure according to the detected pressure values; and calculating a safety scope in pressure reference to the base point of pressure such that an alarm will be generated while the pressure value in the tires has a difference relative to the base point and that is more than the safety scope, wherein to calculate the base point is to average the detected pressure values; and the base point has a front-tires base part corresponding to the pressure values in front tires of the vehicle and a rear-tires base part corresponding to the pressure values in rear tires of the vehicle, wherein the front-tires base part is an average of the pressure values detected from the front tires of the vehicle; and the rear-tires base part is an average of the pressure values detected from the rear tires of the vehicle.

2. A device for setting up an alarm for monitoring pressure in tires of a vehicle comprising:

a main control unit comprising a main controller; and multiple pressure detecting units electrically connected to the main control unit and adapted to detect pressure values of the tires of the vehicle, wherein the main controller has a calculating program for calculating a base point and a safety scope according to the pressure values detected by the pressure detecting units, wherein the calculating program calculates the base point by averaging the detected pressure values; wherein the base point has a front-tires base part corresponding to the pressure values in front tires of the vehicle and a rear-tires base part corresponding to the pressure values in rear tires of the vehicle; wherein the front-tires base part is an average of the pressure values detected from the front tires of the vehicle; and the rear-tires base part is an average of the pressure values detected from the rear tires of the vehicle.

3. The pressure detecting device as claimed in claim 2, wherein the main control unit further comprises:

a signal processing unit electrically connected to the main controller;

a signal receiver electrically connected to the signal processing unit;

an alarm electrically connected to the main controller, and a display set with a display driver electrically connected to the main controller and a display electrically connected to the display driver.

4. The pressure detecting device as claimed in claim 3, wherein the main control unit further comprises a button set electrically connected to the main controller.

5. The pressure detecting device as claimed in claim 3, wherein each detecting unit comprises:

a detecting controller;

a signal processing unit electrically connected to the detecting controller;

a pressure detector electrically connected to the signal processing unit of the detecting unit and adapted to measure pressure in a corresponding one of the tires of the vehicle; and a signal transmitter electrically connected to the signal processing unit of the detecting unit and signal receiver of the main control unit.

6. The pressure detecting device as claimed in claim 5, wherein the signal transmitter of each detecting unit is electrically connected to the main control unit with wire.

7. The pressure detecting device as claimed in claim 5, wherein the signal transmitter of each detecting unit is electrically but wirelessly connected to the main control unit.

8. The pressure detecting device as claimed in claim 5, wherein each detecting unit further comprises a temperature detector electrically connected to the detecting controller and adapted to measure temperature in the corresponding tire.

* * * * *